United States Patent [19]
Oomen et al.

[11] Patent Number: 5,649,054
[45] Date of Patent: Jul. 15, 1997

[54] METHOD AND APPARATUS FOR CODING DIGITAL SOUND BY SUBTRACTING ADAPTIVE DITHER AND INSERTING BURIED CHANNEL BITS AND AN APPARATUS FOR DECODING SUCH ENCODING DIGITAL SOUND

[75] Inventors: Arnoldus W. J. Oomen; Marc E. Groenewegen; Robbert G. Van Der Waal; Raymond N. J. Veldhuis, all of Eindhoven, Netherlands

[73] Assignee: U.S. Philips Corporation, New York, N.Y.

[21] Appl. No.: 361,083

[22] Filed: Dec. 21, 1994

[30]     Foreign Application Priority Data

Dec. 23, 1993 [EP] European Pat. Off. .............. 93203652

[51] Int. Cl.$^6$ ........................................................ G10L 3/02
[52] U.S. Cl. ............................................ 395/2.38; 395/2.09
[58] Field of Search ................................... 395/2.39, 2.38, 395/2.35, 2.36, 2.14, 2.1, 2; 381/29, 30, 31; 341/131, 144, 155, 200

[56]           References Cited

U.S. PATENT DOCUMENTS 5,438,643   8/1995   Akagiri et al. ....................... 395/2.1
5,497,154   3/1996   Komamura ............................ 341/131

*Primary Examiner*—Ayaz R. Sheikh
*Attorney, Agent, or Firm*—Richard A. Weiss

[57]              ABSTRACT

For encoding sound received as a stream of multibit input sample, from a finite length sequence of input samples, an instantaneous audibility threshold characteristic is determined. Next, a shaped, dither determined, signal is subtracted from the input samples to produce processing samples. Subtracting a dither signal dynamically ignores processing sample bits below the threshold. Next, quantization by a variable number of bits below the threshold is performed, while retaining all sample bits above the threshold. The ignored bits are replaced by the dither signal as buried channel bits at an adjustable number of bits per sample. Therefore, upgraded samples have non-ignored bits and buried channel bits are obtained and outputted. The noise is shaped through shape-filtering a difference between the upgraded samples and the processing samples, which shape-filtering may amend a received white-noise-like signal towards an actual threshold-versus-frequency characteristic.

11 Claims, 3 Drawing Sheets

METHOD AND APPARATUS FOR CODING DIGITAL SOUND BY SUBTRACTING ADAPTIVE DITHER AND INSERTING BURIED CHANNEL BITS AND AN APPARATUS FOR DECODING SUCH ENCODING DIGITAL SOUND

BACKGROUND OF THE INVENTION

The invention relates to a method for encoding sound received as a stream of multibit samples while inserting buffed channel bits. Such a method has been described in a publication by M. A. Gerzon and P. G. Craven, 'A High-Rate Buried Channel for Audio CD', preprint 3551 of the Audio Eng. Soc. Conv. Berlin, March 1993. See also International Patent application WO 94/03988, priority Aug. 5, 1992, published Feb. 17, 1994 to the same authors. The first reference bases on a relatively simple way of adding a buried channel through subtractively dithered noise-shaped quantization. Although the added feature allows for enhancing the transmitted high quality sound by a buried channel, the present inventors have discovered that the reference does not fully exploit the potentials of the 'subtraction' principle, which omission leads to either a lower than optimum transfer capacity of the burled channel, or alternatively, to a lower than intended residual perceptive quality of the originally high-quality sound, for example CD sound, but not being limited thereto.

SUMMARY OF THE INVENTION

In consequence, amongst other things, it is an object of the present invention to improve the characteristics of the buried channel inclusion for optimizing both the residual perceptive quality and the transfer capacity of the buried sound channel. Now, according to one of its aspects, the invention is characterized in that the steps of:

constituting a finite length sequence of said input samples and in said sequence determining an instantaneous non-uniform audibility threshold-versus-frequency characteristic;

subtracting a shaped noise signal from said input samples to produce processing samples;

dynamically ignoring processing sample bits below a bit level associated to said characteristic, through subtracting a dither signal (v) and subsequent quantizing by a variable number of b bits below said bit level, but retaining at least all processing sample bits above said bit level;

replacing such ignored processing sample bits by said dither signal as buried channel bits featuring an adjustable number of b bits per said processing sample;

outputting upgraded samples (y) comprising non-ignored processing sample bits and buried channel bits;

while producing said noise signal through shape-filtering by a noise shaping filter on a dither-determined difference between said upgraded samples and said processing samples, which shape-filtering amends a received difference signal towards said instantaneous threshold-versus-frequency characteristic.

In particular, the shape-filtering of the difference towards the instantaneous threshold-versus-frequency characteristic allows for creating "spectrum space" at those frequencies where the human hearing system is relatively insensitive. The result is that for a rather sizable length of samples a uniform number of buried channel bits per sample can be injected. For a subsequent sequence, the number of buried channel bits has to be determined again. An extended feature is that next to shaping the characteristic of the main channel, also the characteristic of the buried channel can be shaped in similar manner to optimize transfer capacity. In particular, the dither signal would have to be shaped. This adds a certain amount of complexity to the system.

Advantageously, the noise-shaping filter receives a difference signal that approaches a white-noise-like characteristic. In many cases, the requirements to the difference signal are not high with respect to its possible influence on the quality of the main channel, and therefore, the dither may have an arbitrary content. In other situations, the difference may not be correlated with the information of the main channel, or may not even be self-correlated. In the latter situations, the dither is preprocessed to get the appropriate absence of correlation. Such randomizing measures by itself are well-known.

Advantageously, said producing is done by a quantizer filter with a variable characteristic. In this way, improved adaptation to said instantaneous audibility and improved subjective audio quality are reached.

Advantageously, said shape-filtering is done with a filter having an overall filter curve compounded from a series of elementary filter curves each positioned at a respective unique grid frequency $\theta_k^c$ and having a width $\Delta_k$ approximating a local power spectral density of the overall spectrum. This is an extremely straightforward method of modelling the power spectrum density, inter alia allowing said grid frequencies to have non-uniform spacing. In general, this improves the accuracy versus the number of grid frequencies used, and thus speeds up the calculation.

The invention also relates to an encoding apparatus for realizing the encoding and to a decoding apparatus for decoding a signal as acquired though effecting of the method. Various further advantages are recited in dependent claims.

BRIEF DESCRIPTION OF THE DRAWING

These and other aspects and advantages of the invention will be described more in detail hereinafter with reference to preferred embodiments, and in particular with reference to the appended drawings, in which.

DESCRIPTION OF THE PREFERRED EMBODIMENTS

The buried channel technology exploits the fact that an audio or sound signal is often represented by an accuracy expressed by the length of its sample bit string that is actually too high in terms of perceived audio quality. Therefore, the amount of information may be reduced for thereby freeing transfer capacity for an additional information service. The additional information is inserted in the least significant portion of the main signal. To a conventional receiver this modification of the main signal is irrelevant inasmuch as a human listener will not notice the difference. An enhanced receiver system however, will retrieve the additional information and produce this on a separate output. According to the invention, the difference spectrum is shape-filtered for mending a received signal towards an actual threshold-versus-frequency characteristic. This allows for creating "spectrum space" at those frequencies where the human hearing system is relatively insensitive. If the difference is white-noise-like, the listener will be even less sensitive to the added channel.

Figure 1:
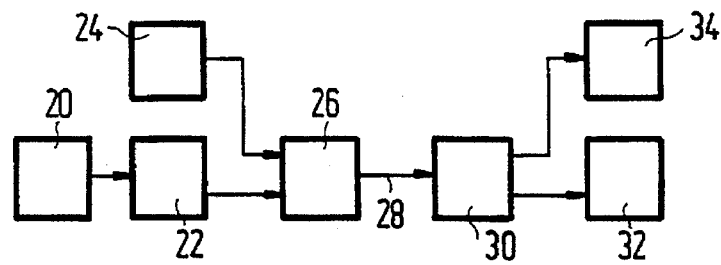
FIG. 1 shows an overall block diagram of a device according to the invention.

FIG. 1 shows an overall block diagram of a device according to the invention. Block 20 is a source of digital sound that is encoded as a stream of samples that may consist, for example of 16 bits each, recurring at some 44 kHz. The sound has a predefined bandwidth and can have an arbitrary content such as music, speech, or other. Block 22 constitutes a finite length of these samples, such that those take up a certain interval of time, say, 1024 samples=0.02 seconds, and therein determines an audibility threshold versus frequency characteristic. The audibility may be determined on the basis of a limited number of key characteristics of the incoming audio. It depends on the instantaneous frequency, on masking effects on one frequency band through influence from another band, it depends on the general or local loudness of the sound, and it may vary between listeners, the last variation being generally ignored, however. The threshold may be determined in ways that by itself are known, and the result will be shown hereinafter. Furthermore, after determination of the threshold, the samples are quantized by ignoring a number of b low-significance bits thereof. Block 24 is a source for buried channel bits. The nature of the buried channel may be arbitrary, such as additional comment to the main channel such as displayable subtitles or text, an additional sound channel in a multi-channel sound reproduction, of similar or respective different quality levels, multi-lingual speech service, Karaoke or even video. Also, non-related services are conceivable. However, a particular advantageous usage is to define the buried channel as a MPEG audio channel. By itself this standard has proven useful to provide high-quality audio transfer at an moderate bit-rate. Furthermore, the buried channel itself may consist of two or more sub-channels that are functionally unrelated, although together making up for the buried part of the upgraded samples. In block 26 the ignored sample bits from source 20, or a fraction thereof, starting at the lower significance levels, are replaced by bits from source 24. Moreover, in mutually spaced locations of the stream of upgraded samples, indications are inserted in the buffed channel as to what is or will subsequently be the number of ignored bits per sample, and if applicable, when the next indication will occur. For efficient operation the spacing between these indications should be set at optimum value. If the spacing is too small, the overhead increases. If the spacing is too large, the number of ignored bits is too low as seen from the individual samples. The channel 28 that may have transmitting, storing or further quality, forwards the upgraded samples to receiver 30. Receiver 30, on the basis of these received indications can separate the standard part of the samples from the buried channel bits. The standard part of the samples is forwarded to decoder 32 that represents the audio in standard manner, wherein the substituted bits are maintained, as representing sub-audible noise. The buried channel bits are forwarded to a subsidiary decoder that has been programmed for correct processing thereof. Another set-up is that the buried channel decoder receives the whole samples as produced at a digital output of a channel receiver and extracts the buried channel information therefrom, while ignoring the standard channel. If, on the other hand a normal non-upgraded receiver has been provided for the channel, this will process the upgraded samples as if they were normal samples. This eventually ends in an analog audio amplifier that feeds some kind of speaker. The buried channel bits, being generally uncorrelated to the main channel bits, now directly represent some kind of noise that remains below the intended auditory threshold.

Figure 2:
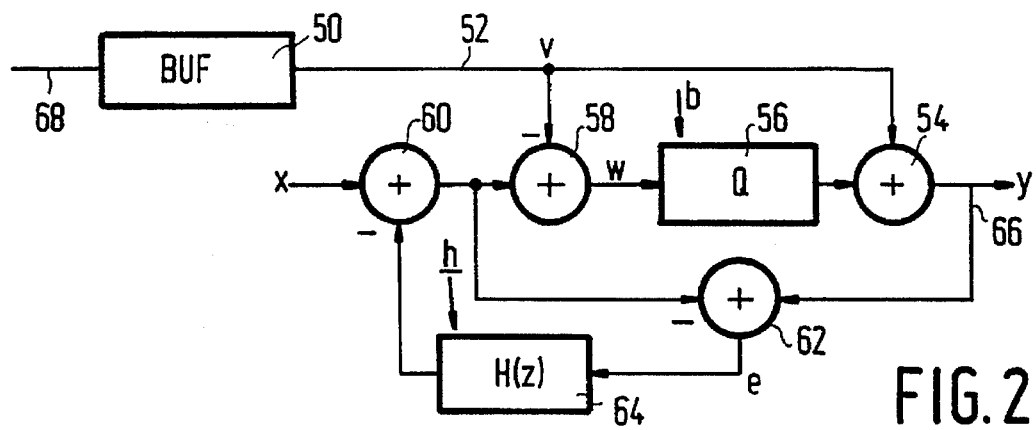
FIG. 2 shows a subtractively dithered quantizer for use as a basis for a buried channel encoder according to the reference enhanced according to the invention.

FIG. 2 shows a subtractively dithered quantizer for use as a basis for a buried channel encoder according to the reference, as enhanced with certain features according to the invention. On input 52 a b-bit dither signal v is input in a way to be discussed hereinafter. Elements 54, 58, 60, 62 are digital adders-subtractors of an appropriate bit width. Element 56 is a quantizer that reduces the accuracy of the exemplary 16-bit received signal x to a lower number of 16-b bits by means of truncation. Such a feature by itself has been described in S. P. Lipshitz et al, "Quantization and Dither: A theoretical Survey", J. Audio Eng. Soc. Vol. 40, no.5, pp.355–375, May 1992. The usage of a b-bit dithered signal v, if the lack of correlation with the main channel is sufficient, ensures that the quantization error e remains spectrally white and statistically independent from the input signal x, which is preferable for perceptivity reasons. The dithered signal may be a randomized version of the buried channel signal, without adding or sacrificing information. Such randomization can be reversed without the need for resynchronization. It is recognized that the random character is specified relative to the main channel, as well as within the buried channel itself. If within the context of the buried channel itself, the signal is well-structured, it may be randomized by conventional means. The same dither signal v is added in element 54 to form the compatible output signal y at output 66, for storage, transmission or further processing. Block 64 is a noise shaping filter and receives the difference between the compatible output signal y and the input signal before introduction of the dithered signal v, as produced by subtractor 62. The output signal of noise shaping filter 64 is fed back to subtractor 60 that in its turn receives the original audio signal x. It has been found that the noise loudness can be decreased by about 16 dB with only a 9-th order FIR (finite impulse response) filter. This approach will make the noise level of a 2–3 bits per sample buried channel signal of comparable loudness as the inherent noise floor in the CD signal. The filter characteristic H(Z) should be such that y, defined as $$y = x + |1 - H(Z)|^2 \cdot \Delta^2 / 12$$

should be changed with respect to x by an amount that is subjectively inconsequential to the listener, $\Delta = 2^b$ being the elementary step size. Now, the transfer rate of the buried channel depends on the coarseness of the requantization operation. In this respect, p.2, 1.40 ff and p.13, fifth para, of the first Gerzon at al reference indicate that the requantization may be made more coarse when the resulting error is masked by a high level main audio signal. The present inventors, on the other hand, have discovered an even more effective way to increase the transfer rate of the buried channel, namely by using the frequency-dependent sensitivity of the human hearing system. A further refinement to the arrangement of FIG. 2 is the buffer 50 that may temporarily store the data supplied by the buried channel 68. In view of the non-uniform rate of the buried channel at output 66, the buffer may have some kind of feed-back organization that keeps its filling degree more or less constant. If the buffer gets too empty, the full capacity of the buried channel may be surrendered in part. If the buffer gets too full, there are various strategies: one is lowering the feed rate from source 68. A more drastic one if more than one buried sub-channel is present, is the surrendering of the least important subchannel therefrom. If the subchannel represents moving video, it could temporarily be reduced to a sequence of stills. Various modifications of the arrangement of, FIG. 2 are self-evident: for example, certain of the addition devices may be changed to subtraction devices. This would slightly complicate the hardware, because of the necessary propagating of borrows. Especially with certain sample notation systems, the impact is minimal, however.

Figure 3:
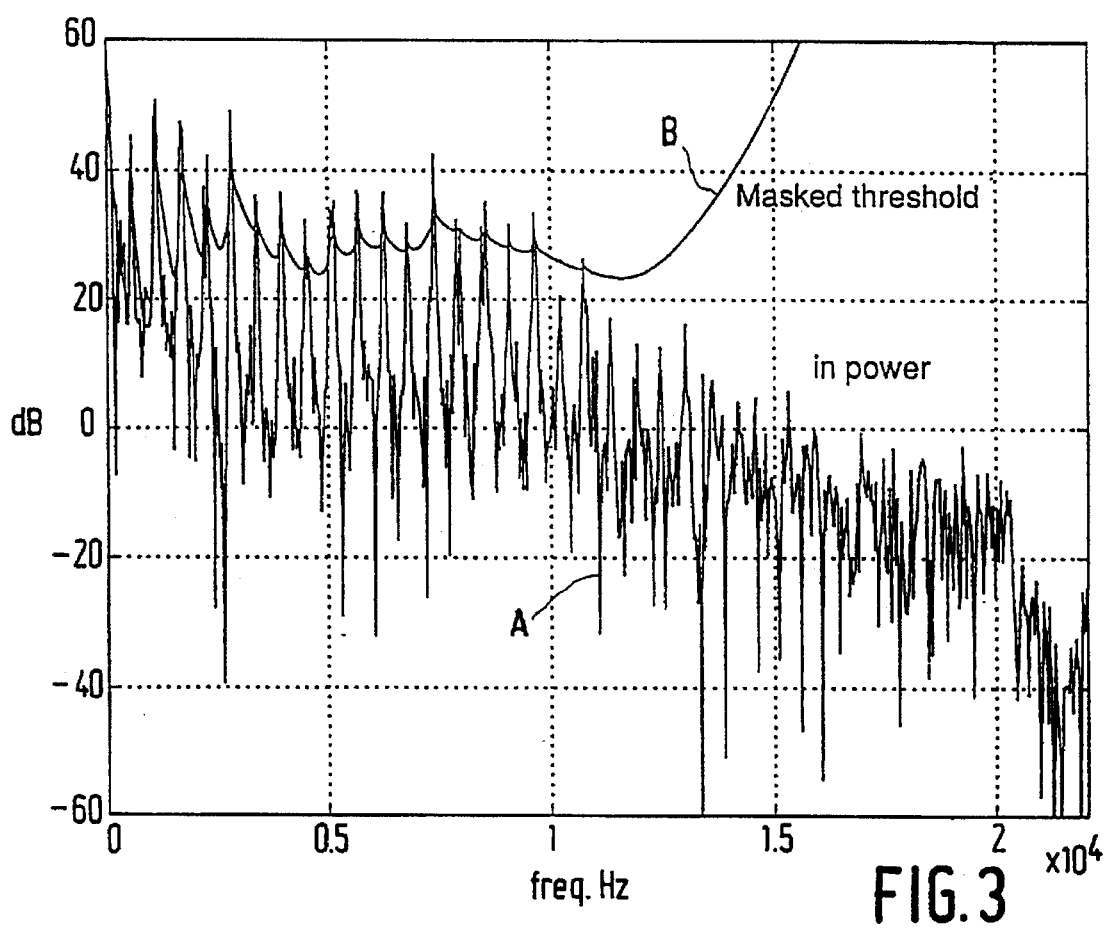
FIG. 3 shows a frequency dependent masked threshold through an exemplary sound spectrum.
Figure 4:
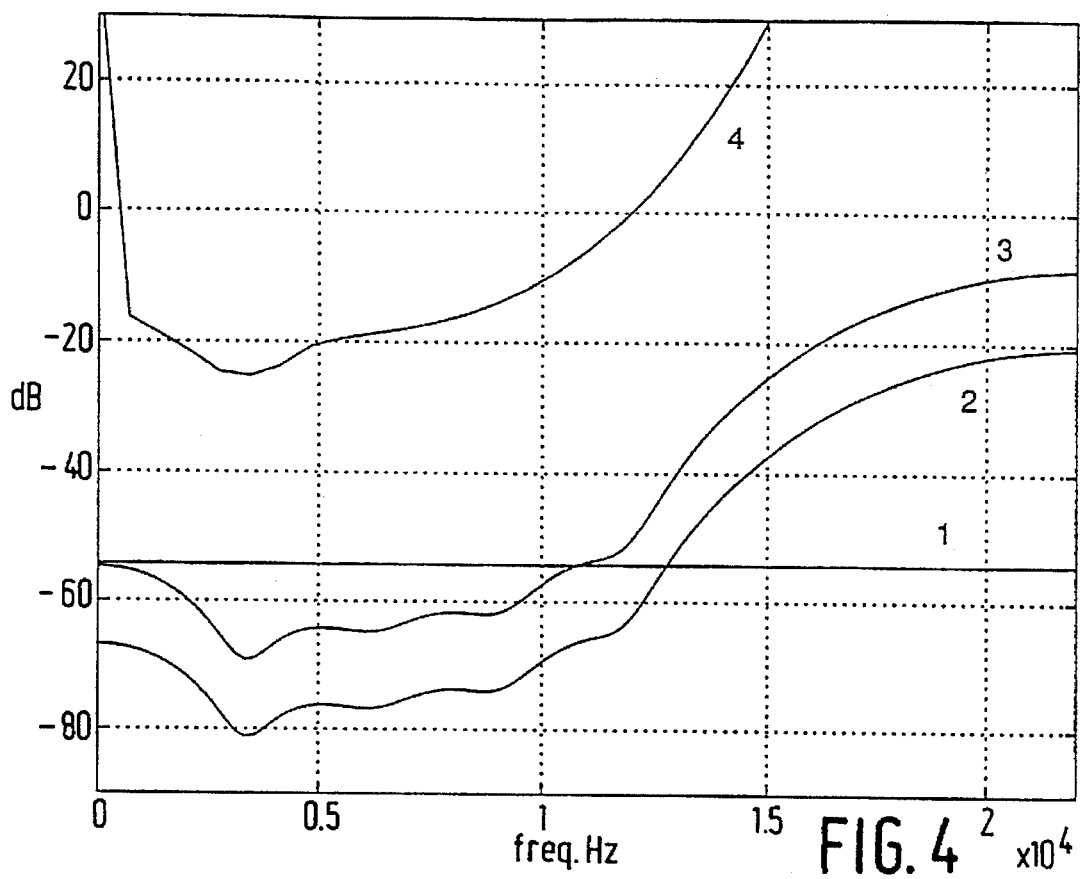
FIG. 4 shows a first exemplary buried channel formation.

In this respect, FIG. 3 shows a frequency dependent masking threshold through a first exemplary sound spectrum. FIG. 4 shows a first exemplary buried channel formation, based on zero sound input.

In FIG. 4, for a standardized or presumed human hearing system, curve 4 gives the audibility level, as based on single frequencies. For calculatory reasons, curve 4 has been simulated (note the straight parts thereof), but it closely follows the natural phenomena. At approximately 4000 Hz this threshold is lowest, whilst being much higher at either higher or lower frequencies. Now, trace 1 indicates the flat CD noise floor, that is given as $10^{10}$ log (1/12×22050) dB. Now, although curve 4 gives the audibility threshold for single frequencies, for noise the audibility effects are much higher, and its frequency characteristic should lie much lower than curve 4. Now, curve 2 is the spectrum of the flat noise of curve 1, shaped to get approximately the same frequency dependence as the threshold of curve 4. It has been found experimentally that neither the few dB deviations from the exact approximation, nor the markedly flatter shape above some 15 kHz have a negative influence on the overall performance. Curve 3 is identical to curve 2, but relatively shifted upward over a distance of b*6 dB, wherein in FIG. 4, b=2. This implies a buried channel of two (2) bits wide per sample. It has been found that the distance between curves 3 and 4 keeps the added information unheard. The minimum distance between curves 1 and 4 is $10^{10}$ log(660), which corresponds to the critical bandwidth around 4 kHz. The design is preferably made with the help of an auxiliary curve that indicates the integrated power of the spectrum of curve 3, and which may not touch curve 4; for simplicity, this auxiliary curve has not been shown.

FIG. 3 shows the influence of an actual sound spectrum on the shape of the audibility threshold. Now curve A is the actual sound spectrum. Curve B again shown the audibility threshold for single tones. Clearly, the valley-like character of curve 4 in FIG. 4 has disappeared.

Figure 5:
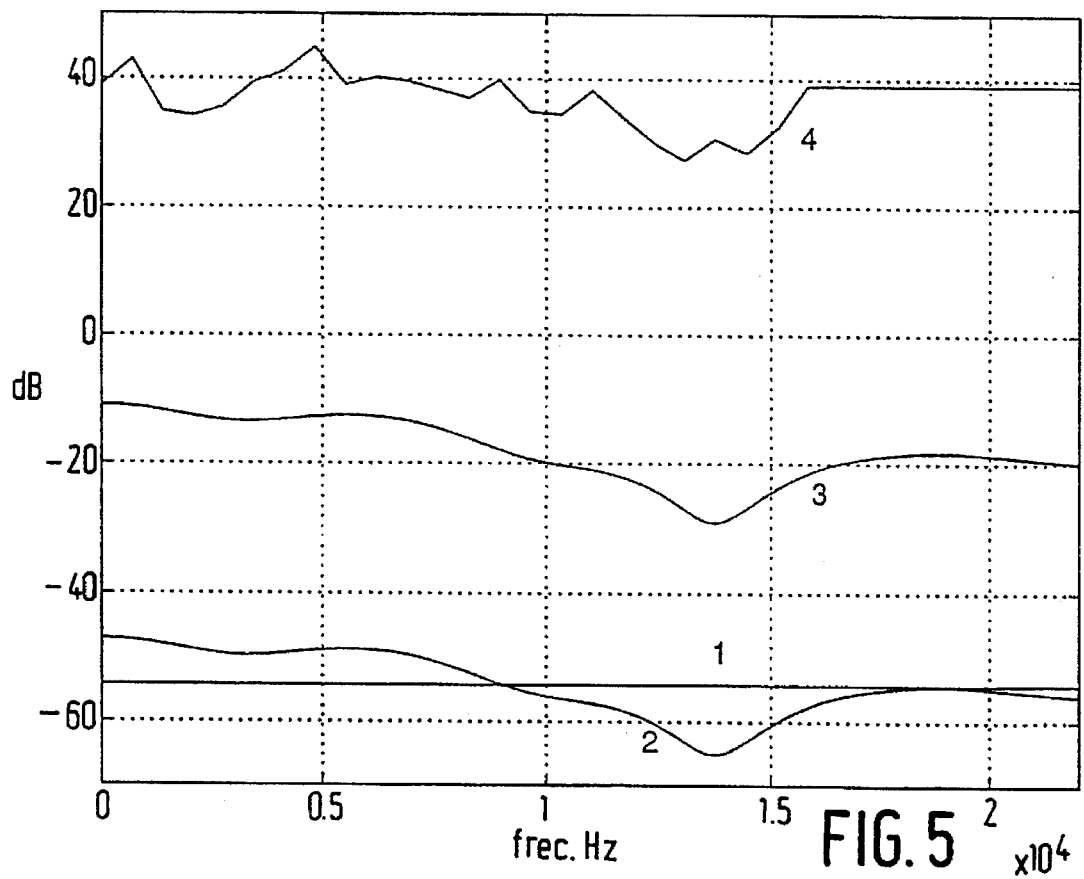
FIG. 5 shows a second exemplary buried channel formation.

FIG. 5 shows a second exemplary buried channel formation. Here the simulated audio spectrum, that may however have a different shape from curve A in FIG. 3, cause the masked audio threshold to lie at an approximate level of 40 dB with a shallow dip of some 10 dB at 13 kHz. For clarity, the spectrum of the audio itself has not been shown. As should be clear from FIG. 3, each separate spectrum peak may raise the masked threshold over a frequency width in the order of the critical frequency, which generally causes the smooth appearance of the threshold curve. Again, the influence of the high-frequency range over 16 kHz has been ignored. Now, curve 1 is the same as in FIG. 4. Curve 2 is again the spectrum of the flat noise, shaped to get approximately the same appearance as the masked threshold of curve 4; in this case, the overall shape of curve 2 is much flatter than in the preceding figure. Curve 3 is identical to curve 2, but relatively shifted upward over a distance of b*6 dB, wherein in FIG. 5, b=6. This implies a buried channel of six bits wide per sample. It has thus been shown that for higher sound energy the width of the buried channel may increase. It has further been shown that the shape of the sound spectrum is crucial in many cases. With the shape of curve 2 in FIG. 4 applied in FIG. 5, the improvement would have been much less in the latter figure. The approach of the preceding figures has been based on the full frequency spectrum. In certain audio systems, the spectrum has been distributed in subbands, wherein the respective subbands carry largely independent audio signals. In such situation, the method and apparatus of the present invention can be applied separately for any subband or subband combination separately. At the price of a somewhat higher complexity, this would further raise the transfer data rate of the buried channel.

Hereinafter, a preferred embodiment for calculating a compound filter curve for filter 64 in FIG. 2 is presented. A relevant publication in this field is E. Ordenflich and Y. Shoham, Low-delay code-excited linear-predictive coding of wideband speech at 32 kbps, Proc. ICASSP-91, pp. 9–12, Toronto, 1991. By itself, the technique presented infra is suitable for various applications in different fields, such as MPE, RPE, and CELP. Therein, an excitation sequence (MPE, RPE) or excitation vector (CELP=codebook excited linear prediction) is selected on the basis of a weighted mean square error criterion.

In such a coder, short output sequences are generated from a number of excitation sequences or vectors. The generated output sequences are compared with the original input sequences. The criterion for comparison is the weighted mean-squared error. This means that the difference between input and generated output is passed through a noise weighting filter. The power of the filtered difference sequence is then estimated. This power is called the weighted mean-squared error. The excitation sequence yielding the minimum weighted mean-squared error is selected.

Figure 6:
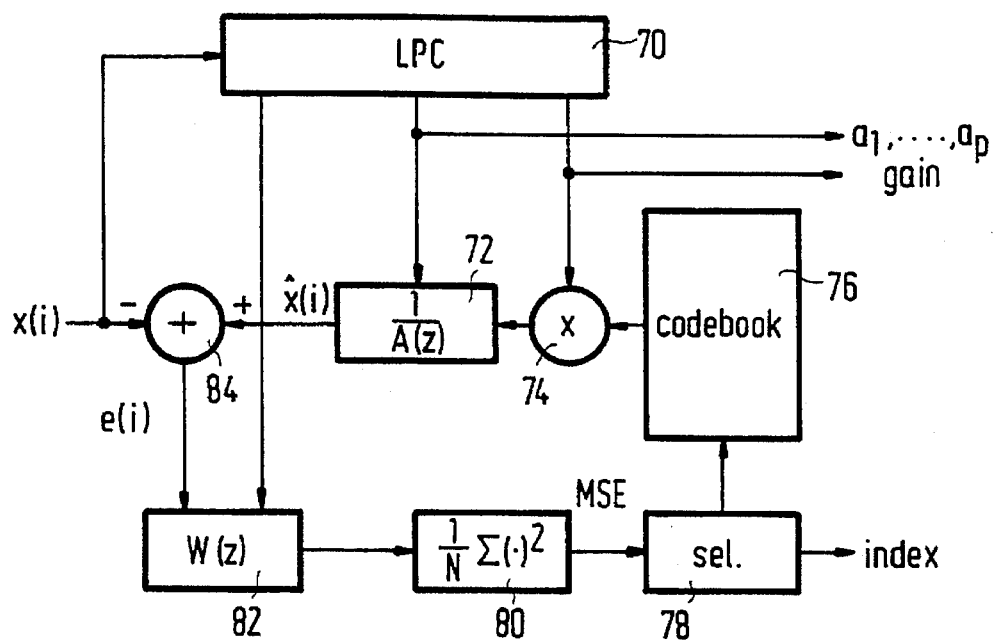
FIG. 6 shows a simplified CELP encoder without pitch prediction.

FIG. 6 shows how a weighting filter is used in a CELP coder. From the incoming speech signal x[i] the box LPC analysis computes the prediction coefficients $a_1, \ldots, a_p$, the coefficients for the weighting filter and a gain factor. The codebook contains a number of excitation vectors. The vector length is N. During selection all vectors are multiplied with the gain factor and passed through an analysis filter. This results in a sequence of N samples denoted by $\hat{x}[i]$. An error sequence is formed by subtracting N input samples x[i] from N samples $\hat{x}[i]$. The error sequence is passed through the weighting filter. The weighted mean-squared error, which is the short-term power of the weighted error sequence, is computed. The selection box selects the code vector that results in the lowest weighted mean-squared error. Gain factor, prediction coefficients and the index of the vectors are transmitted to the decoder.

In this context, an excitation vector is considered as an excitation sequence, therefore only the expression excitation sequence will be used.

The commonly used weighting filters are based on the prediction coefficients (LPC coefficients) $a_1, \ldots, a_p$ of the speech signal. A possible form of this filter is $$W(z) = \frac{1 + \sum_{k=1}^{p} a_k \gamma_1^k z^{-k}}{1 + \sum_{k=1}^{p} a_k \gamma_2^k z^{-k}} \cdot \frac{1}{1 + \sum_{k=1}^{2} p_k \delta^k z^{-k}} \quad (1)$$

The coefficients $p_1$ and $p_2$ are found by applying LPC analysis to the first three autocorrelation lags of the sequence. The coefficients $\delta$, $\gamma_1$ and $\gamma_2$ control the amount of weighting at the position of the formants. They are tuned such that good perceptual performance is obtained. Advantageous values are:

$\delta=0.7$, $\gamma_1=0.95$, $\gamma_2=0.8$.

Other similar forms are useful as well. For a well-chosen codebook, the power spectral density function of the coding error is proportional to $$\left| \frac{1}{W(\exp(j\theta))} \right|^2. \tag{2}$$

Figure 7:
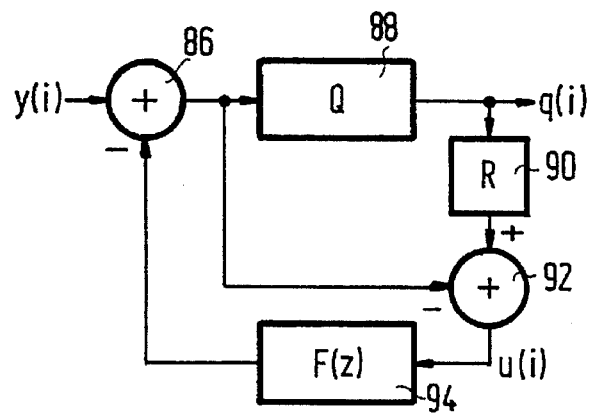
FIG. 7 shows a noise shaping quantizer.

The function of a noise shaper is to give spectral shaping to quantization noise FIG. 7 shows the basic diagram of a noise shaper. It can be shown that after decoding the power spectral density function of the quantization noise is given by $$S(\exp(j\theta)) = |1 + F(\exp(j\theta))|^2 \frac{1}{12} \Delta^2, \tag{3}$$

where $\Delta$ is again the quantization step size. A commonly used filter $F(z)$ in linear predictive coding of speech is $$F(z) = \sum_{k=1}^{p} a_k \gamma^k z^{-k}, \tag{4}$$

with $\gamma<1$. In that case the power spectral density function of the quantization noise is given by $$S(\exp(j\theta)) = \frac{|1 + F(\exp(j\theta))|^2}{\left|1 + \sum_{k=1}^{p} a_k \exp(-j\theta)\right|^2} \frac{1}{12} \Delta^2 =$$

$$\frac{\left|1 + \sum_{k=1}^{p} a_k \gamma^k \exp(-j\theta)\right|^2}{\left|1 + \sum_{k=1}^{p} a_k \exp(-j\theta)\right|^2} \frac{1}{12} \Delta^2, \tag{5}$$

The aim of a weighting filter and of a noise shaper is spectral shaping of the coding error in such a way that distortion is perceptually least disturbing. In music coding several methods estimate the masking level of quantization noise in frequency bands. This level is called masked target level. The goal of these methods is also to obtain a distortion that is perceptually least disturbing. However, they have a better psychoacoustical foundation than the weighting filter of (1) or the noise shaper of (4) and will therefore result in a better approximation of the power spectral density function of masked noise.

The following combines the weighting filter technique or the noise shaping technique with the computation of masked target level. The weighting filters or noise shapers that are thus obtained are better than the known ones because their transfer functions correspond better to the spectral shape of the masked noise.

It is assumed that a set of target levels $t_1, \ldots, t_m$ is computed in advance, for instance, through measurements discussed with respect to. FIGS. 3, 4 and 5. The target levels represent noise powers in frequency bands at masking threshold. These frequency bands must be adjacent and cover the range from zero to half the sampling frequency. Normalized frequencies $\theta$ are used, therefore $-\pi \leq \theta \leq \pi$.

The corresponding audio normalized frequency f follows from $$f = \frac{\theta}{2\pi} f_s,$$

where $f_s$ is the sampling rate.

In the following the bandwidths may be chosen arbitrarily. In practice, critical bands or equally spaced bands will be used. The lower edge, upper edge and centre frequency of the frequency band corresponding to masked target level $t_k$ are denoted by $\theta_k^l$, $\theta_k^u$ and $\theta_k^c$, respectively.

A smooth power spectral density function (psd): $S(\exp(j\theta))$ can be derived from the masked target levels by associating with the kth frequency band a psd-reconstruction function $S_k(\theta)$. The psd then follows from $$S(\exp(j\theta)) = \sum_{k=1}^{m} t_k S_k(\theta). \tag{6}$$

There are some constraints for the psd-reconstruction functions. In the first place, the psd must be non-negative. This implies that $$S_k(\theta) \geq 0, k=1 \ldots, m \tag{7}$$

In the second place, if power preservation, i.e.

$$\frac{1}{2\pi} \int_{-\pi}^{\pi} S(\exp(j\theta)) d\theta = \sum_{k=1}^{m} t_k, \tag{8}$$

is required, then $$\frac{1}{2\pi} \int_{-\pi}^{\pi} S_k(\theta) d\theta = 1, k=1, \ldots, m. \tag{9}$$

A stepwise approximation of the psd is obtained by choosing psd-reconstruction functions $$S_k(\theta) = \frac{\pi}{\Delta_k}, \theta_k^l \leq |\theta| < \theta_k^u, 0, \text{otherwise}, \tag{10}$$

where $\Delta_k = \theta_k^u - \theta_k^l$. Stepwise approximations do not result in a smooth psd. For that a raised-cosine psd-reconstruction function is better suited. This is given by $$S_k(\theta) = \frac{\pi}{2\Delta_k} \left(1 + \cos\left(\frac{\pi}{\Delta_k} |\theta| - \theta_k^c\right)\right), \tag{11}$$

$\theta_k^c - \Delta_k \leq |\theta| < \theta_k^c + \Delta_k$, 0, otherwise

Figure 8:
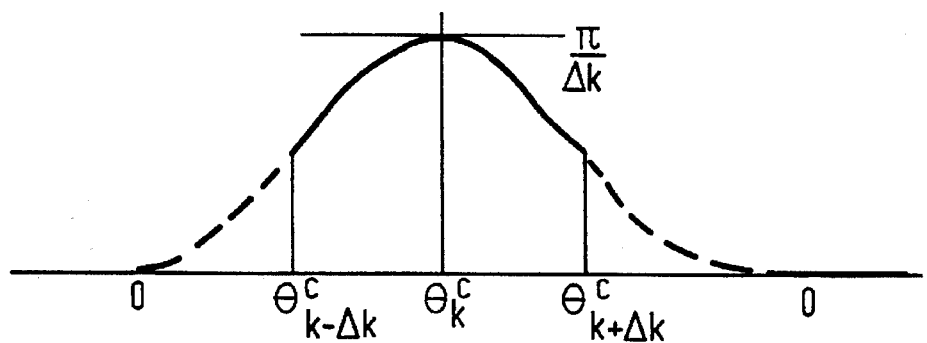
FIG. 8 shows an elementary filter curve.

FIG. 8 shows such an elementary filter curve. Also the raised-cosine psd reconstruction function has its limitations. It cannot for instance reconstruct a flat psd if the frequency bands are unevenly spaced. This can be improved by using different upper and lower slopes. The choice of a psd-reconstruction function is determined by the desired spectral behaviour of the masked noise.

The reconstructed psd $S(\exp(j\theta))$ is approximated by an all-pole spectrum $$\hat{S}(\exp(j\theta)) = \frac{\sigma^2}{\left|1 + \sum_{k=1}^{q} b_k \exp(-jk\theta)\right|^2}, \tag{12}$$

where q is the order of the all-pole spectrum. This results in a weighting filter with transfer function $$B(z) = 1 + \sum_{k=1}^{1} b_k z^{-k}. \quad (13)$$

The weighting filter is an FIR filter, in contrast to the filter of (1). In the following the $b_1, \ldots, b_q$ are computed from the $t_1, \ldots, t_m$, by minimizing $$Q(b_1, \ldots, b_q) = \frac{1}{2\pi} \int_{-\pi}^{\pi} S(\exp(j\theta))|B(\exp(j\theta))|^2 d\theta \quad (14)$$

as a function of $b_1, \ldots, b_q$. In (14), $S(\exp(j\theta))$ follows from (6). By way of summarizing: it is required to approximate the spectrum $S(\theta)$, wherein $\theta$ is a normalized frequency. Now, the function B is the inverse function of F(eq.23) and Q is a constant. Now, computing derivatives $$\frac{\partial Q(b_1, \ldots, b_q)}{\partial b_n}, n = 1, \ldots, q,$$

and setting them equal to zero leads to the following set of equations $$\frac{1}{2\pi} \int_{-\pi}^{\pi} \sum_{k=1}^{m} t_k S_k(\theta) \left( 1 + \sum_{l=1}^{q} b_l \exp(-jl\theta) \right) \exp(jn\theta) d\theta = 0, \quad (15)$$

$$n = 1, \ldots, q.$$

Or, $$\sum_{l=1}^{q} b_l \sum_{k=1}^{m} t_k \frac{1}{2\pi} \int_{-\pi}^{\pi} S_k(\theta) \exp(j\theta(n-l)) d\theta = \quad (16)$$

$$-\sum_{k=1}^{m} t_k \frac{1}{2\pi} \int_{-\pi}^{\pi} S_k(\theta) \exp(jn\theta) d\theta, n = 1, \ldots, q$$

Define $$g_{k,n} = \frac{1}{2\pi} \int_{-\pi}^{\pi} S_k(\theta) \exp(jn\theta) d\theta, k = 1, \ldots, m, n = 1, \ldots, q \quad (17)$$

and $$p_n = \sum_{k=1}^{m} t_k g_{k,n}. \quad (18)$$

The $g_{k,n}$ can be computed in advance from the psd-reconstruction functions and stored in an m×q matrix. On substitution of these results into (16) one obtains the set of equations $$\sum_{l=1}^{q} p_{n-l} b_l = -p_n, n = 1, \ldots, q. \quad (19)$$

This is a symmetrical, positive-definite Toeplitz system that is identical to the Yule-Walker equations, known from linear predictive ceding. Define the q×q matrix R by $$r_{i,j} = p_{i-j}, i,j = 1, \ldots, q,$$

and the q vector r by $$r_i = p_i, i = 1, \ldots, q.$$

This leads to $$Rb = -r, \quad (20)$$

where the q vector b contains the coefficients $b_1, \ldots, b_q$. The set (19) or (20) is easily solved by the known Levinson-Durbin algorithm.

EXAMPLES OF $g_{k,n}$

For the stepwise approximation of $S(\exp(j\theta))$ the $g_{k,n}$ are given by $$g_{k,n} = \cos(n\theta_k^c) \frac{\sin\left(n\frac{\Delta_k}{2}\right)}{n\frac{\Delta_k}{2}}. \quad (21)$$

For the raised-cosine approximation of $S(\exp(j\theta))$ the $g_{k,n}$ are given by $$g_{k,n} = \cos(n\theta_k^c) \frac{\sin(n\Delta_k)}{n\Delta_k} \frac{\left(\frac{\pi}{\Delta_k}\right)^2}{\left(\frac{\pi}{\Delta_k}\right)^2 - n^2}. \quad (22)$$

The coefficients $b_1, \ldots, b_q$ can be directly applied in a weighting filter W(z), as shown in FIG. 7. In that W(z)=B(z), with B(z) defined in (13). In case of a noise shaper, the F(z) follows from $$1 - F(z) = \frac{1}{B(z)}, \quad (23)$$

therefore $$f(z) = \frac{\sum_{k=1}^{q} b_k z^{-k}}{1 + \sum_{k=1}^{q} b_k z^{-k}}. \quad (24)$$

We claim:
1. A method for encoding a sound representation received as a stream of multibit input samples, comprising:
   constituting a finite length sequence of said input samples and in said sequence determining an instantaneous non-uniform audibility threshold-versus-frequency characteristic;
   subtracting a shaped noise signal from said input samples to produce processing samples;
   dynamically ignoring processing sample bits below a bit level associated to said characteristic, through subtracting a dither signal (v) and subsequent quantizing by a variable number of b bits below said bit level, but retaining at least all processing sample bits above said bit level;
   replacing such ignored processing sample bits by said dither signal as buried channel bits featuring an adjustable number of b bits per said processing sample; and
   outputting upgraded samples (y) comprising non-ignored processing sample bits and buried channel bits;
   wherein said noise signal is produced through shape-filtering by a noise shaping filter on a dither-determined difference between said upgraded samples and said processing samples, which shape-filtering amends a received difference signal towards said instantaneous threshold-versus-frequency characteristic.

2. The method as claimed in claim 1, wherein said noise-shaping filter receives a difference signal that approaches a white-noise-like characteristic.

3. The method as claimed in claim 1, wherein said producing is done by a noise-shaping filter with a variable characteristic.

4. The method as claimed in claim 1, and featuring detecting a musical transient in a particular time interval, and upon such detecting setting the value of b in that interval to a value at least co-determined from a neighbouring time interval not having that musical transient.

5. The method as claimed in claim 1, and featuring temporary buffering of data to be used as buried channel data before said replacing in a buffer and through a time varying rate control time-wise equalizing a filling degree of said buffer.

6. The method as claimed in claim 1, wherein said buried channel data is received as an MPEG audio channel.

7. The method as claimed in claim 1, wherein said shape-filtering is done with a filter having an overall filter curve compounded from a series of elementary filter curves each positioned at a respective unique grid frequency $\theta_k^c$ and having a width $\Delta_k$ approximating a local power spectral density of the overall spectrum.

8. The method as claimed in claim 7, wherein said grid frequencies have non-uniform spacing.

9. The method as claimed in claim 1 and applied separately to respective frequency subbands that are coexistent in a frequency spectrum of said sound representation.

10. An encoding apparatus for encoding a sound representation received as a stream of multibit input samples, comprising:

means for constituting a finite length sequence of said input samples and in said sequence determining an instantaneous non-uniform audibility threshold-versus-frequency characteristic;

means for subtracting a shaped noise signal from said input samples to produce processing samples;

means for dynamically ignoring processing sample bits below a bit level associated to said characteristic, through subtracting a dither signal (v) and subsequent quantizing by a variable number of b bits below said bit level, but retaining at least all processing sample bits above said bit level; and means for replacing such ignored processing sample bits by said dither signal as buried channel bits featuring an adjustable number of b bits per said processing sample;

means for outputting upgraded samples (y) comprising non-ignored processing sample bits and buried channel bits;

wherein said noise signal is produced through shape-filtering by a noise shaping filter on a dither-determined difference between said upgraded samples and said processing samples, which shape-filtering amends a received difference signal towards said instantaneous threshold-versus-frequency characteristic.

11. A decoding apparatus for decoding a signal of upgraded samples comprising:

means for receiving said signal of upgraded samples, which signal is has been encoded by means of the following method:

constituting a finite length sequence of input samples from a stream of multibut input samples representing a sound representation and in said sequence determining an instantaneous non-uniform audibility threshold-versus-frequency characteristic;

subtracting a shaped noise signal from said input samples to produce processing samples;

dynamically ignoring processing sample bits below a bit level associated to said characteristic, through subtracting a dither signal (v) and subsequent quantizing by a variable number of b bits below said bit level, but retaining at least all processing sample bits above said bit level;

replacing such ignored processing sample bits by said dither signal as buried channel bits featuring an adjustable number of b bits per said processing sample; and outputting upgraded samples (y) comprising non-ignored processing sample bits and buried channel bits;

wherein said noise signal is produced through shape-filtering by a noise shaping filter on a dither-determined difference between said upgraded samples and said processing samples, which shape-filtering amends a received difference signal towards said instantaneous threshold-versus-frequency characteristic; and means for decoding said signal of upgraded samples.

* * * * *